(12) United States Patent
Jiang et al.

(10) Patent No.: US 11,901,592 B2
(45) Date of Patent: Feb. 13, 2024

(54) SOFC COOLING SYSTEM, FUEL CELL AND HYBRID VEHICLE

(71) Applicant: Ceres Intellectual Property Company Limited, Horsham (GB)

(72) Inventors: Longkai Jiang, Shandong (CN); Youpeng Chen, Shandong (CN); Weilong Song, Shandong (CN); Yaxin Du, Shandong (CN); Meng Cao, Shandong (CN)

(73) Assignee: Ceres Intellectual Property Company Limited, Horsham (GB)

( * ) Notice: Subject to any disclaimer, the term of this patent is extended or adjusted under 35 U.S.C. 154(b) by 0 days.

(21) Appl. No.: 17/764,614

(22) PCT Filed: Sep. 30, 2020

(86) PCT No.: PCT/IB2020/059161
§ 371 (c)(1),
(2) Date: Mar. 29, 2022

(87) PCT Pub. No.: WO2021/064602
PCT Pub. Date: Apr. 8, 2021

(65) Prior Publication Data
US 2022/0407091 A1 Dec. 22, 2022

(30) Foreign Application Priority Data
Sep. 30, 2019 (CN) .......................... 201921672207.8

(51) Int. Cl.
*H01M 8/04029* (2016.01)
*H01M 8/04007* (2016.01)
(Continued)

(52) U.S. Cl.
CPC ... *H01M 8/04029* (2013.01); *H01M 8/04067* (2013.01); *H01M 8/04358* (2013.01);
(Continued)

(58) Field of Classification Search
CPC ..... H01M 2008/1293; H01M 2250/20; H01M 8/04029; H01M 8/04067; H01M 8/04164;
(Continued)

(56) References Cited

U.S. PATENT DOCUMENTS

| 2004/0072043 | A1* | 4/2004 | Hashimoto | ....... H01M 8/04253 |
| | | | | 429/513 |
| 2006/0006108 | A1* | 1/2006 | Arias | ................ H01M 8/04589 |
| | | | | 429/513 |
| 2019/0181476 | A1 | 6/2019 | Jeong | |

FOREIGN PATENT DOCUMENTS

| CN | 207350992 U | * | 5/2018 | ............. Y02E 10/44 |
| CN | 110120533 A | | 8/2019 | |

(Continued)

OTHER PUBLICATIONS

Machine translation DE102014224380A1 (Year: 2016).*
(Continued)

*Primary Examiner* — Victoria H Lynch
(74) *Attorney, Agent, or Firm* — SNELL & WILMER L.L.P.

(57) ABSTRACT

The invention provides an SOFC cooling system. For the feature that not all components work in the full operation process of an SOFC, a DC step-down transformer DCDC, a fan and a condenser are connected in parallel, and a solenoid valve is installed in each parallel pipeline for controlling on/off of each pipeline according to a corresponding signal. Compared with the traditional SOFC cooling system, the constant-flow serial cooling system will reduce pressure losses and the power of a water pump; a solenoid valve is installed in each parallel pipeline for controlling on/off of each branch according to a corresponding signal; considering the cooling requirements of SOFC during start-up, power generation and shutdown, all components are cooled in parallel through reasonable design of each parallel pipe- (Continued)

line, consequently to improve the cooling effect and reduce the energy consumption; the invention also discloses a fuel cell and hybrid vehicle.

6 Claims, 2 Drawing Sheets

(51) Int. Cl.
  *H01M 8/0432* (2016.01)
  *H01M 8/0438* (2016.01)
  *H01M 8/04537* (2016.01)
  *H01M 8/04701* (2016.01)
  *H01M 8/04746* (2016.01)
  *H01M 8/12* (2016.01)
(52) U.S. Cl.
  CPC ... *H01M 8/04402* (2013.01); *H01M 8/04417* (2013.01); *H01M 8/04597* (2013.01); *H01M 8/04701* (2013.01); *H01M 8/04768* (2013.01); *H01M 2008/1293* (2013.01); *H01M 2250/20* (2013.01)

(58) Field of Classification Search
  CPC ............. H01M 8/043; H01M 8/04358; H01M 8/04402; H01M 8/04417; H01M 8/04589; H01M 8/04597; H01M 8/04701; H01M 8/04768; H01M 8/04947
  See application file for complete search history.

(56) References Cited

FOREIGN PATENT DOCUMENTS

DE     102014224380 A1    6/2016
WO       2016083365 A1    6/2016

OTHER PUBLICATIONS

Machine translation CN110120533A (Year: 2019).*
Machine Translation CN207350992U (Year: 2018).*
WIPO; International Search Report and Written Opinion dated Jan. 22, 2021 in Application No. PCT/IB2020/059161.

* cited by examiner

US 11,901,592 B2

SOFC COOLING SYSTEM, FUEL CELL AND HYBRID VEHICLE

This application is a national stage entry of International Patent Application No. PCT/IB2020/059161, filed 30 Sep. 2020, entitled "SOFC COOLING SYSTEM, FUEL CELL AND HYBRID VEHICLE," which claims priority to Chinese Patent Application No. 201921672207.8, filed on 30 Sep. 2019, the disclosures of which are hereby incorporated by reference in their entirety.

TECHNICAL FIELD

The present invention relates to an SOFC cooling system, a fuel cell, and a hybrid vehicle.

BACKGROUND ART

SOFC (Solid Oxide Fuel Cell) is a power generation device, which directly converts the chemical energy stored in fuel and oxidant into electrical energy. Compared with other fuel cells, it has the advantages of high efficiency, wide fuel scope and no need to apply noble metal electrodes.

When the SOFC operates, a stack and a hot component need to be preheated first during start up, and thus a fan is required to provide compressed air continuously. Meanwhile, a coolant is required to cool the fan which heats up during its operation. Furthermore, a DC-DC step-down transformer is required to convert a fixed DC current into a variable DC current during the power generation. The DC-DC step-down transformer also heats up during its operation. Hence, the coolant is also required to cool the DC-DC step-down transformer. In the meantime, a condenser is required to cool an anode exhaust gas at a high temperature after it is exhausted, thereby realizing water and vapor separation and continuous burning in a burner. Also, the coolant is required for heat exchange to cool the anode exhaust gas when the condenser operates. Again, the fan is required to provide a system the large-capacity cold air at the time of powering off. For this, the coolant is also required to cool the fan.

In the prior art, as shown in FIG. 1, a constant-flow serial cooling system is mainly used to cool the fan, the DC-DC step-down transformer, and the condenser. But this constant-flow serial cooling system is poor in cooling effect and high in energy consumption.

SUMMARY OF THE INVENTION

The present invention provides an SOFC cooling system, a fuel cell, and a hybrid vehicle to address the problem.

A first aspect of the invention provides an SOFC cooling system, comprising a radiator, a water tank, a water pump, a DC-DC step-down transformer, a fan, a condenser, a current sensor, a first flowmeter, and a second flowmeter. The DC-DC step-down transformer, the fan, and the condenser are connected in parallel, and a solenoid valve is installed in each parallel pipeline (or supply) for controlling on/off of each pipeline according to a corresponding signal. The current sensor is provided in a circuit of the DC-DC step-down transformer for detecting a current signal of the DC-DC step-down transformer. The first flowmeter is provided in a pipeline of the fan for detecting a flow signal in the pipeline of the fan. The second flowmeter is provided in an anode exhaust gas pipeline of the condenser for detecting a flow signal of anode exhaust gas in a pipeline of the condenser. A first end of the radiator is connected with a first end of the water pump and the water tank, respectively. A second end of the water pump is connected with a first end of the parallel system, and a second end of the radiator is connected with a second end of the parallel system.

The solenoid valve group can be a proportional valve group, and an opening degree of the proportional valve installed in each pipeline can be controlled according to the corresponding signal, so as to regulate back pressures of different pipelines.

The cooling system can further comprise a temperature sensor provided in a pipeline between the radiator and the water pump for detecting a temperature of a coolant in the pipeline between the radiator and the water pump.

The radiator can be a revolving speed-adjustable cooling fan.

The water pump can be a flow-adjustable water pump.

A second aspect of the invention provides a fuel cell, comprising the SOFC cooling system of the first aspect.

A third aspect of the invention provides a hybrid vehicle, comprising the fuel cell of the second aspect.

The present invention provides an SOFC cooling system. For the feature that not all components work in the overall operation process of the SOFC, the DC-DC step-down transformer, the fan, and the condenser are connected in parallel, and the solenoid valve is installed in each parallel pipeline for controlling on/off of each pipeline according to a corresponding signal. Compared with the traditional SOFC cooling system, the constant-flow serial cooling system will reduce pressure loss and the power of the water pump. The solenoid valve is installed in each parallel pipeline for controlling on/off of each branch according to a corresponding signal; considering the cooling requirements of the SOFC during start-up, power generation and power-off, all components are cooled in parallel through reasonable design of each parallel pipeline, thereby improving the cooling effect and reducing the energy consumption. The invention also discloses a fuel cell and hybrid vehicle.

BRIEF DESCRIPTION OF THE DRAWINGS

The drawings used in the description will be briefly described below. The drawings in the description below are just some embodiments of the present invention.

DETAILED DESCRIPTION

The present invention provides an SOFC cooling system, a fuel cell, and a hybrid vehicle, all of which effectively match the on/off modes of an SOFC. Because not all components work continuously or identically in the overall operation process of the SOFC, pipelines of the SOFC cooling system are designed accordingly.

The present invention aims to solve the problem in which the constant-flow serial cooling system applied in the prior art is poor in cooling effect and high in energy consumption.

Embodiments of the present invention will be described in an exemplary manner below in conjunction with the accompanying drawings. The described embodiments are some, not all of the embodiments of the present invention.

The inventors have discovered that the constant-flow serial cooling system is used to cool the fan, the DC-DC step-down transformer, and the condenser in the prior art has a poor cooling effect and a high energy consumption. Based on the analysis by the inventors, it is discovered that all components have different working modes at different stages due to the specific on/off modes of the SOFC. Thus, such problems as poor cooling effect and high energy consumption will be caused by a serial connection mode. To solve such problems of poor cooling effect and high energy consumption, the inventors put forward the solution in the present invention in which all components are cooled in parallel to improve the cooling effect and lower the energy consumption.

It should be noted that the operation process of the SOFC includes startup, power generation, and power-off according to the specific on/off mode of the SOFC.

For example, a stack and a hot component need to be preheated first during start-up, and thus a fan is required to provide a large quantity of compressed air to cool the fan which heats up during this process. The stack does not power and anode exhaust gas is not exhausted, and thus the DC-DC step-down transformer and the condenser do not need to be cooled.

The smaller an air amount required by the stack reaction during its power generation, the less the quantity of heat the fan generates. Meanwhile, anode exhaust gas at high temperature is exhausted when the system is used for power generation. Thus, the fan, the DC-DC step-down transformer and the condenser all need to be cooled.

The fan is required to provide the system with a large quantity of cold air at the time of powering off. For this, the coolant also needs to operate for cooling. The stack does not power and the anode exhaust gas is not exhausted, and thus the DC-DC step-down transformer and the condenser do not need to operate.

Figure 1:
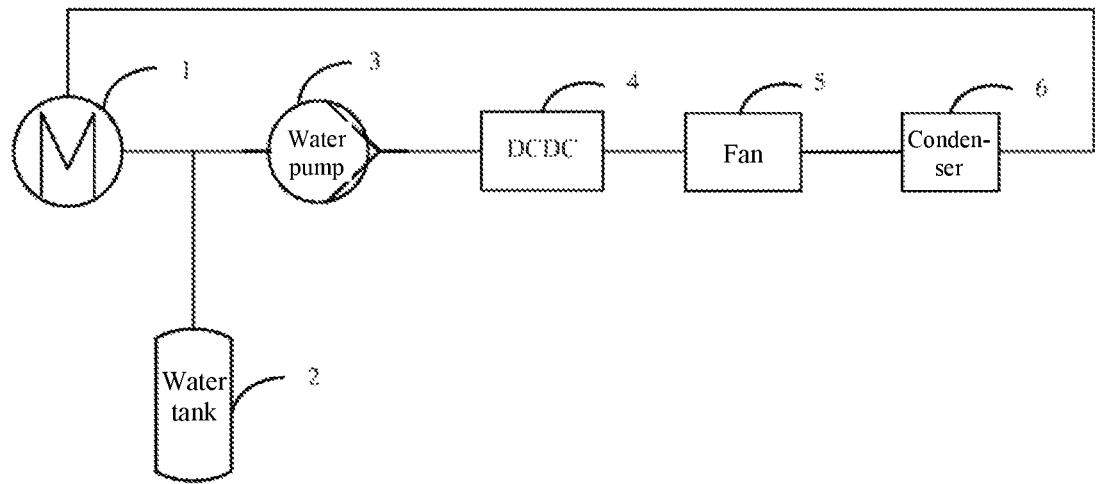
FIG. 1 is a structural schematic view of a constant-flow serial cooling system.
Figure 2:
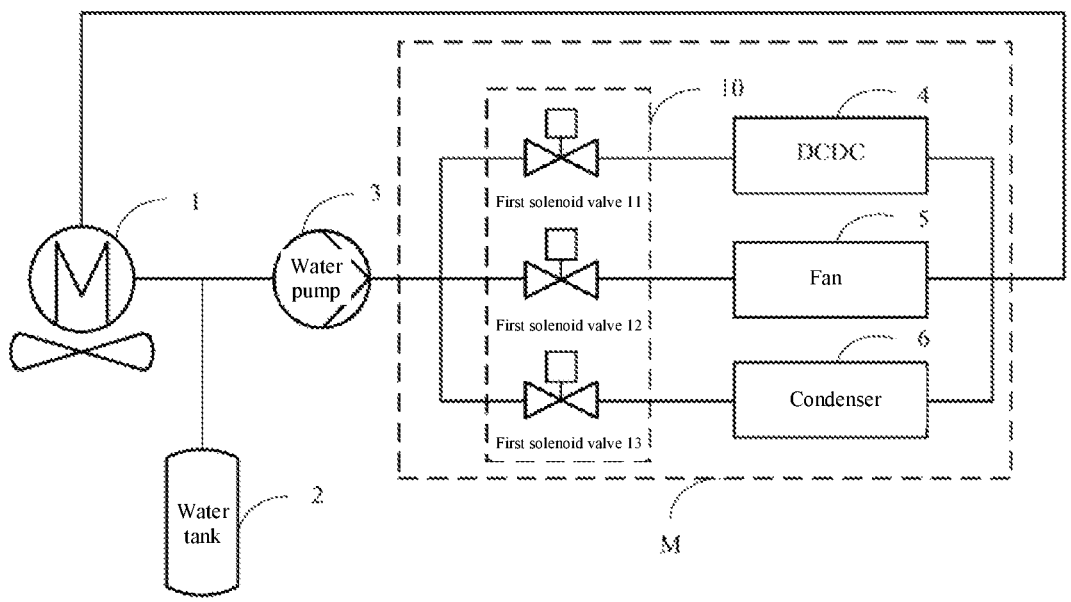
FIG. 2 is a structural schematic view of an SOFC cooling system.

FIG. 2 is a structural schematic view of an SOFC cooling system provided by an embodiment of the present invention. The SOFC cooling system comprises a radiator 1, a water tank 2, a water pump 3, a DC-DC step-down transformer 4, a fan 5, a condenser 6, a current sensor 7, a first flowmeter 8, and a second flowmeter 9.

The DC-DC step-down transformer 4, the fan 5, and the condenser 6 are connected in parallel, and a solenoid valve group 10 is installed in each parallel pipeline for controlling on/off operation of each pipeline according to a corresponding signal. This constitutes a parallel system M, as shown in FIG. 2, comprising a first solenoid valve 11, a second solenoid valve 12, and a third solenoid valve 13.

Figure 3:
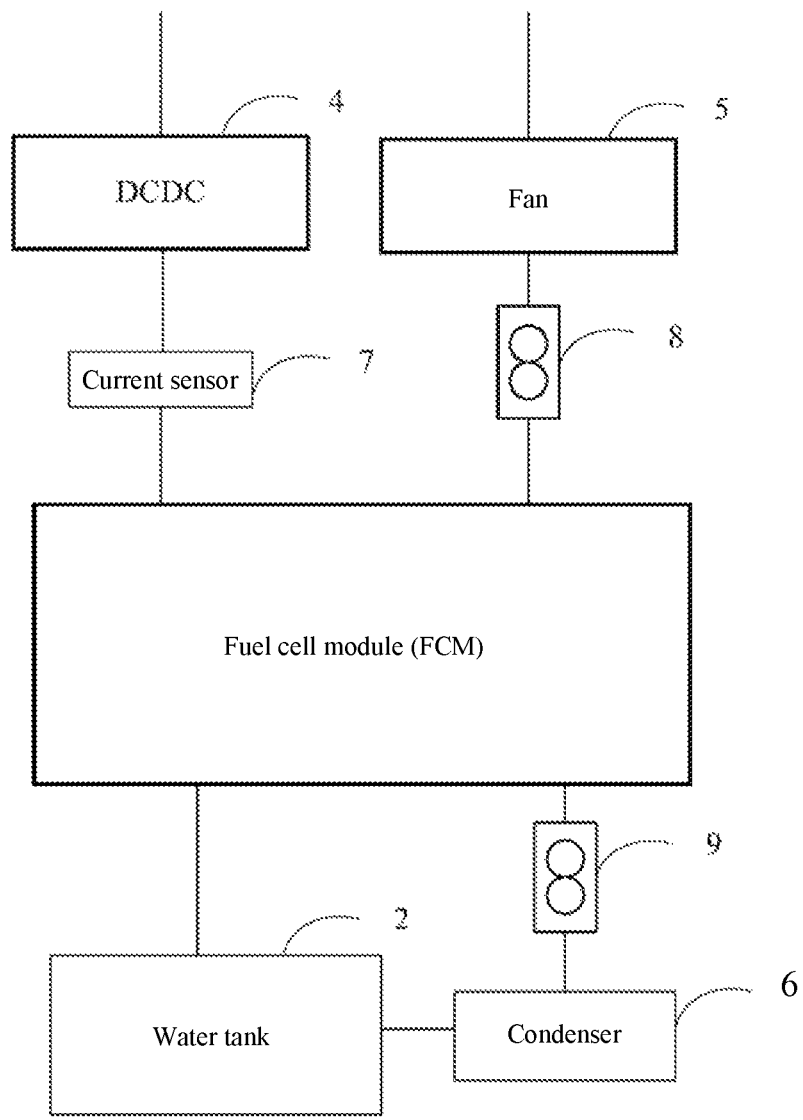
FIG. 3 is an installation location diagram of all sensors.

As shown in FIG. 3, the current sensor 7 is provided in a circuit between a fuel cell module (FCM) and the DC-DC step-down transformer 4 for detecting a current signal of the DC-DC step-down transformer 4. The first flowmeter 8 is arranged in a pipeline between the FCM and the fan 5 for detecting a flow signal in a pipeline of the fan 5. The second flowmeter 9 is arranged in a pipeline between the FCM and the condenser 6 for detecting an anode exhaust gas flow signal in a pipeline of the condenser 6.

A first end of the radiator 1 is connected with a first end of the water pump 3 and the water tank 2, respectively. A second end of the water pump 3 is connected with a first end of the parallel system M, and a second end of the radiator 1 is connected with a second end of the parallel system M.

Because not all components work continuously or at the same level in the overall operation process of the SOFC in the embodiments of the present invention, the DC-DC step-down transformer, the fan, and the condenser are connected in parallel, and a solenoid valve group is installed in each parallel pipeline for controlling on/off operation of each pipeline according to a corresponding signal. Compared with the traditional SOFC cooling system, the constant-flow serial cooling system will reduce pressure loss and the power of the water pump The solenoid valve is installed in each parallel pipeline for controlling on/off operation of every branch according to the corresponding signal. The specific solution is as follows: the second solenoid valve is controlled to be opened when the first flowmeter arranged at an outlet of the fan detects a flow signal; the third solenoid valve is controlled to be opened when the second flowmeter arranged in a condenser pipeline detects a flow signal; the first solenoid valve is controlled to be opened when the current sensor in the circuit of the DC-DC step-down transformer detects a current signal.

The solenoid valve group 10 is a proportional valve group, and the opening degree of the proportional valve installed in each pipeline is controlled according to the corresponding signal, so as to regulate back pressures of different pipelines.

When the first flowmeter 8 arranged at the outlet of the fan 5 detects the flow signal, the corresponding proportional valve is controlled to be opened, and meanwhile the opening degree of the corresponding proportional valve can be controlled according to the size of the flow signal. When the second flowmeter 9 arranged in the pipeline of the condenser 6 detects the flow signal, the corresponding proportional valve is controlled to be opened, and meanwhile the opening degree of the corresponding proportional valve can be controlled according to the size of the flow signal. When the current sensor 7 in the circuit of the DC-DC step-down transformer 4 detects the current signal, the corresponding proportional valve is controlled to be opened, and meanwhile the opening degree of the corresponding proportional valve can be controlled according to the corresponding signal.

All solenoid valves in the embodiments of the present invention play the role of a back-pressure valve. Parallel cooling pipelines solve the problem in which a traditional serial pipeline is large in pressure loss, but the problem of distributing the flow unevenly or not distributing the flow based on the setting can arise. Hence, with respect to the flow distribution problem, the proportional valves are installed in all pipelines in the present invention, and the back-pressure in each pipeline is adjusted by the proportional valve, so that the pipeline flow is adjusted, and the flow distribution problem in the parallel pipe is solved.

Further, the SOFC cooling system further comprises a temperature sensor provided in a pipeline between the radiator and the water pump for detecting a temperature of a coolant in a pipeline between the radiator and the water pump.

In the embodiments of the present invention, the radiator includes a speed-adjustable cooling fan, and a rotation speed of the cooling fan can be adjusted correspondingly according to the temperature of the coolant. The water pump is a flow-adjustable water pump, which is more efficient compared with a traditional constant flow water pump due to the fact that the flow of the water pump can be adjusted according to the temperature fed back by the temperature sensor, When the speed-adjustable cooling fan and the flow-adjustable water pump are used, compared with the constant flow of the known SOFC cooling system, the temperature of the coolant can be lowered only by the cooling fan at the fixed revolving speed in the known system. Also, in this solution, the flow of the water pump can be adjusted to increase the flow of the coolant, and aa air speed of the cooling fan can be adjusted to take away more heat, thereby further protecting the corresponding components.

The present invention also discloses a fuel cell, wherein the fuel cell comprises the SOFC cooling system.

An embodiment of the present invention also discloses a hybrid vehicle, wherein the hybrid vehicle comprises the above fuel cell.

The invention provides an SOFC cooling system, a fuel cell and a hybrid vehicle. Because not all components work continuously or at the same level in the full operation process of an SOFC, a DC-DC step-down transformer, a fan, and a condenser are connected in parallel, and a solenoid valve group is installed in each parallel pipeline for controlling on/off operation of each pipeline according to a corresponding signal, to constitute a parallel system. Compared with the known SOFC cooling system, the constant-flow serial cooling system will reduce pressure loss and the power of a water pump. The solenoid valve is installed in each parallel pipeline for controlling on/off operation of each branch according to a corresponding signal. Considering the cooling requirements of the SOFC during start-up, power generation and power-off, all components are cooled in parallel through appropriate design of each parallel pipeline, thereby improving the cooling effect and reducing the energy consumption.

Relational terms such as "first" and "second" and the like herein may be used solely to distinguish one entity or action from another entity or action without necessarily requiring or implying any such actual relationship or order between such entities or actions.

Various modifications to these embodiments will be apparent. The general principle defined herein can be implemented in other embodiments without departing from the scope of the present invention.

The invention claimed is:

1. An SOFC system, comprising a fuel cell module and a cooling system, the cooling system comprising:
   a radiator,
   a water tank,
   a water pump,
   a DC step-down transformer configured to step down current produced by the fuel cell module,
   a fan configured to cool the fuel cell module,
   a condenser configured to cool an anode exhaust gas from the fuel cell module,
   a current sensor,
   a first flowmeter, and
   a second flowmeter,
   wherein:
      the DC step-down transformer, the fan, and the condenser are connected in parallel, and a solenoid valve group is installed in each parallel supply and is configured to control switching on and off of each supply according to a corresponding signal, to constitute a parallel system, wherein the solenoid valve group comprises a first solenoid valve connected to the DC step-down transformer, a second solenoid valve connected to the fan, and a third solenoid valve connected to the condenser;
      the current sensor is provided in a circuit between the fuel cell module and the DC step-down transformer and is configured to detect a current signal of the DC step-down transformer to control the first solenoid valve;
      the first flowmeter is provided between the fuel cell module and the fan and is configured to detect a flow signal in a pipeline of the fan to control the second solenoid valve;
      the second flowmeter is provided between the fuel cell module and the condenser and is configured to detect a flow signal of anode exhaust gas to control the third solenoid valve;
      a first end of the radiator is connected with a first end of the water pump and the water tank, respectively;
      a second end of the water pump is connected with a first end of the parallel system; and
      a second end of the radiator is connected with a second end of the parallel system.

2. The SOFC system according to claim 1, wherein the solenoid valve group is a proportional valve group, and the opening degree of the proportional valve installed in each supply is controllable according to the corresponding signal, so as to regulate back pressures of different supplies.

3. The SOFC system according to claim 1, further comprising a temperature sensor in a pipeline between the radiator and the water pump configured to detect the temperature of a coolant in the pipeline.

4. The SOFC system according to claim 1, wherein the radiator comprises an adjustable speed cooling fan.

5. The SOFC system according to claim 1, wherein the water pump is an adjustable flow water pump.

6. A hybrid vehicle, comprising the fuel cell of claim 1.

* * * * *